United States Patent
Shingai et al.

(10) Patent No.: US 10,527,873 B2
(45) Date of Patent: Jan. 7, 2020

(54) TRANSPARENT CONDUCTOR AND TOUCH PANEL

(71) Applicant: TDK Corporation, Tokyo (JP)

(72) Inventors: Hiroshi Shingai, Tokyo (JP); Yoshihisa Tamagawa, Tokyo (JP); Motohiro Sakurai, Tokyo (JP)

(73) Assignee: TDK CORPORATION, Tokyo (JP)

( * ) Notice: Subject to any disclaimer, the term of this patent is extended or adjusted under 35 U.S.C. 154(b) by 71 days.

(21) Appl. No.: 15/556,107

(22) PCT Filed: Mar. 25, 2016

(86) PCT No.: PCT/JP2016/059600
§ 371 (c)(1),
(2) Date: Sep. 6, 2017

(87) PCT Pub. No.: WO2016/153034
PCT Pub. Date: Sep. 29, 2016

(65) Prior Publication Data
US 2018/0024388 A1    Jan. 25, 2018

(30) Foreign Application Priority Data
Mar. 26, 2015  (JP) .................................. 2015-064922

(51) Int. Cl.
*G02F 1/03*    (2006.01)
*B32B 7/02*    (2019.01)
(Continued)

(52) U.S. Cl.
CPC .............. *G02F 1/0316* (2013.01); *B32B 7/02* (2013.01); *B32B 9/00* (2013.01); *B32B 9/041* (2013.01);
(Continued)

(58) Field of Classification Search
CPC ................. G02F 1/0316; G02F 1/1333; G02F 1/133553; B32B 7/02; B32B 9/00;
(Continued)

(56) References Cited

U.S. PATENT DOCUMENTS

| | | | | |
|---|---|---|---|---|
| 5,296,302 A | * | 3/1994 | O'Shaughnessy | B32B 17/06 |
| | | | | 428/472 |
| 6,774,558 B2 | * | 8/2004 | Otani | H01J 9/02 |
| | | | | 313/489 |

(Continued)

FOREIGN PATENT DOCUMENTS

| JP | H09-291355 A | 11/1997 |
|---|---|---|
| JP | 2001-328198 A | 11/2001 |

(Continued)

OTHER PUBLICATIONS

Oct. 26, 2018 Extended European Search Report issued in European Patent Application No. 16768937.1.

(Continued)

*Primary Examiner* — Tom V Sheng
(74) *Attorney, Agent, or Firm* — Oliff PLC

(57) ABSTRACT

Provided is a transparent conductor including a transparent resin substrate, a first metal oxide layer, a metal layer containing a silver alloy, and a second metal oxide layer laminated in the order presented, wherein the second metal oxide layer contains zinc oxide, indium oxide, titanium oxide, and tin oxide.

13 Claims, 5 Drawing Sheets

(51) Int. Cl.
  *B32B 9/00* (2006.01)
  *G02F 1/1333* (2006.01)
  *G06F 3/041* (2006.01)
  *H01B 5/14* (2006.01)
  *B32B 9/04* (2006.01)
  *G02F 1/1335* (2006.01)

(52) U.S. Cl.
  CPC ............ *B32B 9/045* (2013.01); *G02F 1/1333* (2013.01); *G02F 1/133553* (2013.01); *G06F 3/041* (2013.01); *H01B 5/14* (2013.01); *B32B 2311/08* (2013.01); *B32B 2311/16* (2013.01); *B32B 2311/18* (2013.01); *B32B 2311/20* (2013.01)

(58) Field of Classification Search
  CPC ..... B32B 9/041; B32B 9/045; B32B 2311/08; B32B 2311/16; B32B 2311/18; B32B 2311/20; G06F 3/041; H01B 5/14
  See application file for complete search history.

(56) References Cited

U.S. PATENT DOCUMENTS

| | | | |
|---|---|---|---|
| 2003/0012936 A1* | 1/2003 | Draheim | C08F 2/44 428/216 |
| 2004/0038051 A1 | 2/2004 | Fujisawa et al. | |
| 2004/0209420 A1* | 10/2004 | Ljungcrantz | H01L 21/32051 438/239 |
| 2008/0105302 A1* | 5/2008 | Lu | H01L 31/022466 136/258 |
| 2008/0210303 A1* | 9/2008 | Lu | H01L 31/02168 136/260 |
| 2008/0302414 A1* | 12/2008 | den Boer | H01L 31/022466 136/256 |
| 2009/0315849 A1 | 12/2009 | Ito | |
| 2011/0223433 A1* | 9/2011 | Hammond | C23C 18/1216 428/448 |
| 2015/0205409 A1* | 7/2015 | Shingai | G06F 3/044 345/174 |
| 2016/0258694 A1* | 9/2016 | Mitsumoto | F28F 13/18 |
| 2017/0075044 A1* | 3/2017 | Watanabe | G02B 5/26 |
| 2018/0197649 A1* | 7/2018 | Shingai | B32B 7/02 |

FOREIGN PATENT DOCUMENTS

| | | |
|---|---|---|
| JP | 2001-328199 A | 11/2001 |
| JP | 2002-157929 A | 5/2002 |
| JP | 2012-135888 A | 7/2012 |
| JP | 2016-184533 A | 10/2016 |
| WO | 2014/167835 A1 | 10/2014 |
| WO | 2014/171149 A1 | 10/2014 |

OTHER PUBLICATIONS

Jun. 14, 2016 International Search Report issued in International Patent Application No. PCT/JP2016/059600.
Oct. 5, 2017 International Preliminary Report on Patentability issued in International Patent Application No. PCT/JP2016/059600.
Jun. 10, 2019 Office Action issued in Chinese Patent Application No. 201680018090.4.
U.S. Appl. No. 15/577,161, filed Nov. 27, 2017 the name of Shingai et al.
May 30, 2019 Office Action issued in U.S. Appl. No. 15/577,161.
Jan. 31, 2017 Search Report issued in International Application No. PCT/JP2016/086602.
Jun. 21, 2018 International Preliminary Report on Patentability issued in International Application No. PCT/JP2016/086602.

* cited by examiner

TRANSPARENT CONDUCTOR AND TOUCH PANEL

TECHNICAL FIELD

The present disclosure relates to a transparent conductor and a touch panel using the same.

BACKGROUND ART

Transparent conductors are used for displays such as liquid crystal displays (LCDs), plasma display panels (PDPs), and electroluminescence panels (organic EL, inorganic EL), and transparent electrodes for solar cells or the like. In addition, transparent conductors are used for electromagnetic insulation films and infrared shield film. For a material of a metal oxide layer of a transparent conductor, ITO, which is a substance obtained by adding tin (Sn) to indium oxide ($In_2O_3$), is widely used.

Terminals provided with a touch panel such as smartphones and tablet terminals have been rapidly spreading in recent years. They have a configuration in which a touch sensor part is provided on a liquid crystal panel, and a cover glass is provided on the outermost surface. The touch sensor part is configured with one sheet or two sheets pasted together, each sheet being obtained by forming an ITO film through sputtering on one surface or both surfaces of a glass or a substrate for a film.

In association with upsizing of touch panels and achievement of highly precise touch sensor function, a transparent conductor having a high transmittance and low resistance has been required. It is required for lowering of the resistance of a transparent conductor with an ITO film to thicken the ITO film or to crystalize the ITO film through thermal annealing. However, thickening of the ITO film leads to lowering of the transmittance. In addition, it is typically difficult to perform thermal annealing for a substrate for a film at high temperature. Thus, it is currently difficult to lower the resistance of an ITO film provided on a substrate for a film while the transmittance is kept high.

In such circumstances, a transparent conductive film having a laminate structure of a metal oxide layer containing indium oxide or zinc oxide as a primary component and metal layer has been proposed (e.g., Patent Literatures 1 and 2).

CITATION LIST

Patent Literature

Patent Literature 1: Japanese Unexamined Patent Publication No. 2002-157929
Patent Literature 2: Japanese Unexamined Patent Publication No. H9-291355

SUMMARY OF INVENTION

Technical Problem

For use as a touch panel or the like, a patterning process is performed to form a conductive part and an insulating part so that a touched position can be detected. In a patterning process, typically, a resist pattern is formed, and then etching is performed with an acid to form an electrode pattern, and finally the resist is peeled off with an alkaline solution. To perform such a patterning process smoothly, the metal layer and metal oxide layer are required to be removable by etching in a single operation and also to be excellent in resistance to alkaline solutions.

In view of this, the present invention provides, in one aspect, a transparent conductor having a laminate structure of metal oxide layers and a metal layer, the transparent conductor being excellent in both solubility in acids for etching and resistance to alkaline solutions. The present invention provides, in another aspect, a touch panel which can be efficiently manufactured by using such a transparent conductor.

Solution to Problem

The present invention provides, in one aspect, a transparent conductor comprising a transparent resin substrate, a first metal oxide layer, a metal layer containing a silver alloy, and a second metal oxide layer laminated in the order presented, wherein the second metal oxide layer contains zinc oxide, indium oxide, titanium oxide, and tin oxide.

The transparent conductor has a laminate structure including a second metal oxide layer and a metal layer containing a silver alloy. The second metal oxide layer and metal layer are excellent in solubility in acids for etching, and thus removable by etching in a single operation. In addition, the second metal oxide layer is excellent in resistance to alkaline solutions (resistance to alkalis). Accordingly, the transparent conductor can be suitably used for applications requiring etching such as touch panels.

In some embodiments, in the second metal oxide layer of the transparent conductor, the content of the zinc oxide may be 20 to 68 mol %, the content of the indium oxide may be 15 to 35 mol %, the content of the titanium oxide may be 5 to 15 mol %, and the content of the tin oxide may be 5 to 40 mol %, with respect to the total of four components of the zinc oxide, the indium oxide, the titanium oxide, and the tin oxide in terms of $ZnO$, $In_2O_3$, $TiO_2$, and $SnO_2$, respectively. The configuration in which zinc oxide, indium oxide, titanium oxide, and tin oxide are contained at the above ratio imparts more excellent solubility in acids and resistance to alkalis to the second metal oxide layer, and further improves the transparency, conductivity, and storage stability under high temperature and high humidity conditions.

In some embodiments, the metal layer of the transparent conductor may have a thickness of 4 to 11 nm. This configuration provides the transparent conductor with a sufficiently high transparency and low surface resistance.

In some embodiments, the first metal oxide layer of the transparent conductor may contain the four components. In the first metal oxide layer, the content of the zinc oxide may be 20 to 68 mol %, the content of the indium oxide may be 15 to 35 mol %, the content of the titanium oxide may be 5 to 15 mol %, and the content of the tin oxide may be 5 to 40 mol %, with respect to the total of four components of the zinc oxide, the indium oxide, the titanium oxide, and the tin oxide in terms of $ZnO$, $In_2O_3$, $TiO_2$, and $SnO_2$, respectively. This configuration allows removal of the first metal oxide layer, the second metal oxide layer, and the metal layer by etching in a single operation. Not only the second metal oxide layer, but also the first metal oxide layer is excellent in resistance to alkalis. Accordingly, the transparent conductor can be suitably used for applications requiring etching such as touch panels.

In some embodiments, the silver alloy in the metal layer of the transparent conductor may be an alloy of Ag and at least one metal selected from the group consisting of Pd, Cu, Nd, In, Sn, and Sb. This configuration imparts a more excellent total light transmittance and conductivity to the transparent conductor.

The present invention provides, in another aspect, a touch panel comprising a sensor film on a panel sheet, wherein the sensor film is configured with the above transparent conductor. Since the touch panel includes a sensor film configured with the above transparent conductor, the touch panel can be efficiently manufactured through smooth patterning.

Advantageous Effects of Invention

The present invention can provide a transparent conductor having a laminate structure of metal oxide layers and a metal layer, the transparent conductor being excellent in both solubility in acids and resistance to alkaline solutions. In addition, the present invention can provide a touch panel which can be efficiently manufactured by using such a transparent conductor.

DESCRIPTION OF EMBODIMENTS

Figure 1:
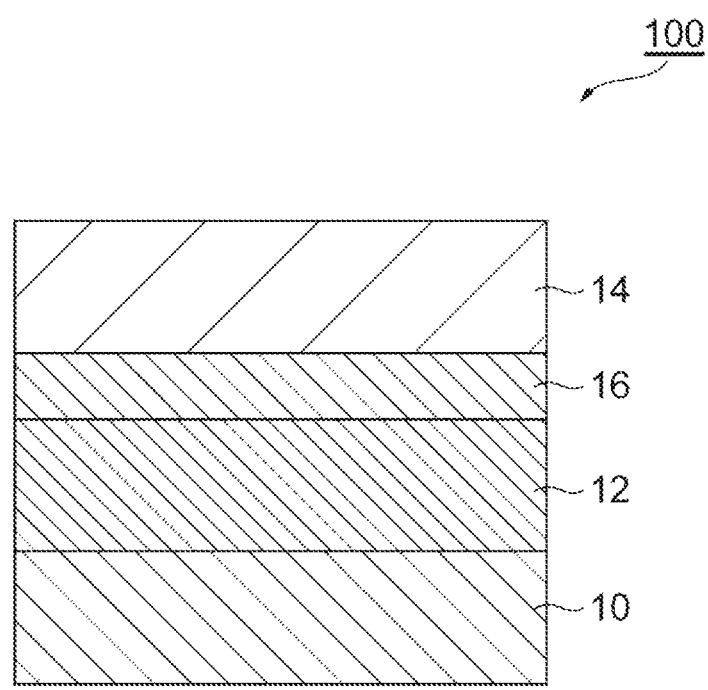
FIG. 1 is a cross-sectional view schematically illustrating one embodiment of the transparent conductor.

Embodiments of the present invention will be described in detail below with reference to drawings. However, the embodiments below are examples to describe the present invention, and are not intended to limit the present invention to the contents below. In descriptions, an identical reference sign is used for identical elements or elements having identical function, and redundant descriptions are occasionally omitted. The positional relation such as right and left and up and down in a drawing is as illustrated in the drawing, unless otherwise specified. In addition, the dimensional ratio in a drawing is not limited to that illustrated in the drawing.

FIG. 1 is a schematic cross-sectional view illustrating one embodiment of the transparent conductor. A transparent conductor 100 has a laminate structure in which a film-shaped transparent resin substrate 10, a first metal oxide layer 12, a metal layer 16, and a second metal oxide layer 14 are disposed in the order presented.

"Transparent" in the present specification means that visible lights transmit, and a certain degree of light scattering is permitted. The degree of light scattering required for the transparent conductor 100 depends on the application thereof. What is called "semitransparent", which allows light scattering, is also included in the concept of "transparent" in the present specification. It is preferable that the degree of light scattering be smaller and the transparency be higher. The total light transmittance of the transparent conductor 100 is, for example, 80% or higher, preferably 83% or higher, and more preferably 85% or higher. The total light transmittance is transmittance for light including diffused transmitted light and determined by using an integrating sphere, and measured by using a commercially available hazemeter.

The transparent resin substrate 10 may be any flexible organic resin film, without any limitation. The organic resin film may be an organic resin sheet. Examples of the organic resin film include polyester films such as polyethylene terephthalate (PET) films and polyethylene naphthalate (PEN) films; polyolefin films such as polyethylene films and polypropylene films; polycarbonate films; acrylic films; norbornene films; polyarylate films; polyether sulfone films; diacetylcellulose films; and triacetylcellulose films. Among them, polyester films such as polyethylene terephthalate (PET) films and polyethylene naphthalate (PEN) films are preferable.

It is preferable that the transparent resin substrate 10 be thicker, from the viewpoint of rigidity. On the other hand, it is preferable that the transparent resin substrate 10 be thinner, from the viewpoint of thinning of the transparent conductor 100. From such viewpoints, the thickness of the transparent resin substrate 10 is, for example, 10 to 200 µm. The refractive index of the transparent resin substrate is, for example, 1.50 to 1.70, from the viewpoint of achieving a transparent conductor excellent in optical properties. The refractive index in the present specification is a value measured under conditions of $\lambda=633$ nm and a temperature of 20° C.

It is preferable that the transparent resin substrate 10 have high dimensional stability in heating. Generally, a flexible organic resin film undergoes dimensional change due to swelling or shrinkage caused by heating during film production. In single-screw extrusion or twin-screw extrusion, a thin transparent resin substrate 10 can be produced at low cost. When the transparent conductor 100 is heated in formation of extraction electrodes, the transparent conductor 100 undergoes dimensional change due to thermal shrinkage. Such dimensional change can be measured in accordance with ASTM D1204-02 or JIS-C-2151. When the dimension before heating is denoted as Lo and the dimension after heating is denoted as L, the dimensional change rate after heating treatment can be determined by using the following formula.

$$\text{dimensional change rate (\%)}=100\times(L-Lo)/Lo$$

A positive dimensional change rate (%) indicates that the heating treatment caused swelling, and a negative dimensional change rate (%) indicates that the heating treatment caused shrinkage. The dimensional change rate of the transparent resin substrate 10 after being subjected to twin-screw extrusion can be measured for both of the machine direction (MD direction) and transverse direction (TD direction) in the extrusion. The dimensional change rate of the transparent resin substrate 10 is, for example, −1.0 to −0.3% in the MD direction and −0.1 to +0.1% in the TD direction.

The transparent resin substrate 10 may have been subjected to at least one surface treatment selected from the group consisting of corona discharge treatment, glow discharge treatment, flame treatment, ultraviolet irradiation treatment, electron beam irradiation treatment, and ozone treatment. The transparent resin substrate may be a resin film. The configuration in which a resin film is used can impart excellent flexibility to the transparent conductor 100. Thereby, the transparent conductor 100 can be used not only as a transparent conductor for touch panels, but also for transparent electrodes of flexible organic EL lights or the like or electromagnetic shielding.

When the transparent conductor 100 is used as a sensor film constituting a touch panel, for example, a flexible organic resin film may be used for the transparent resin substrate 10 so as to allow appropriate deformation in response to an external input by the finger, a pen, or the like.

The second metal oxide layer 14 is a transparent layer containing an oxide, and contains four components of zinc oxide, indium oxide, titanium oxide, and tin oxide, as primary components. The configuration in which the four components are contained in the second metal oxide layer 14 as primary components allows the second metal oxide layer 14 to have conductivity and high transparency in combination. Thus, low surface resistance can be obtained, without thermal annealing, through the combination of the second metal oxide layer 14 and the metal layer 16. The zinc oxide is, for example, ZnO, the indium oxide is, for example, $In_2O_3$, the titanium oxide is, for example, $TiO_2$, and the tin oxide is, for example, $SnO_2$. The ratio of metal atoms to oxygen atoms in each metal oxide may be deviated from the stoichiometric ratio.

In the second metal oxide layer 14, the content of zinc oxide with respect to the total of the four components is, for example, 20 mol % or more, from the viewpoint of achieving a sufficiently high transmittance and conductivity. In the second metal oxide layer 14, the content of zinc oxide with respect to the total of the four components is, for example, 68 mol % or less, from the viewpoint of achieving sufficiently high storage stability.

In the second metal oxide layer 14, the content of indium oxide with respect to the total of the four components is, for example, 35 mol % or less, from the viewpoint of achieving a sufficiently high transmittance with the surface resistance kept sufficiently low. In the second metal oxide layer 14, the content of indium oxide with respect to the total of the four components is, for example, 15 mol % or more, from the viewpoint of achieving sufficiently high storage stability.

In the second metal oxide layer 14, the content of titanium oxide with respect to the total of the four components is, for example, 15 mol % or less, from the viewpoint of achieving a sufficiently high transmittance. In the second metal oxide layer 14, the content of titanium oxide with respect to the total of the four components is, for example, 5 mol % or more, from the viewpoint of achieving sufficiently high resistance to alkalis.

In the second metal oxide layer 14, the content of tin oxide with respect to the total of the four components is, for example, 40 mol % or less, from the viewpoint of achieving a sufficiently high transmittance. In the second metal oxide layer 14, the content of tin oxide with respect to the total of the four components is, for example, 5 mol % or more, from the viewpoint of achieving sufficiently high storage stability. The contents of the four components are values as zinc oxide, indium oxide, titanium oxide, and tin oxide are converted to ZnO, $In_2O_3$, $TiO_2$, and $SnO_2$, respectively.

The second metal oxide layer 14 has a function to adjust optical properties, a function to protect the metal layer 16, and a function to ensure the conductivity, in combination. The second metal oxide layer 14 may contain, in addition to the four components, any trace component or inevitable component in a quantity such that the functions of the second metal oxide layer 14 are not largely impaired. However, it is preferable that the fraction of the total of the four components in the second metal oxide layer 14 be high, from the viewpoint of imparting sufficiently high properties to the transparent conductor 100. In this case, the fraction is, for example, 95 mol % or more, and preferably 97 mol % or more. The second metal oxide layer 14 may consist of the four components.

The first metal oxide layer 12 and the second metal oxide layer 14 may be identical or different in thickness, structure, and composition. The description on the composition of the second metal oxide layer 14 can be directly applied to the first metal oxide layer 12. The configuration in which the first metal oxide layer 12 has the same composition as the second metal oxide layer 14 allows removal of the first metal oxide layer 12, the metal layer 16, and the second metal oxide layer 14 by etching in a single operation. In addition, the transparency and resistance to alkalis can be further enhanced.

The first metal oxide layer 12 may have a composition different from that of the second metal oxide layer 14. In this case, only the second metal oxide layer 14 and metal layer 16 can be removed by etching while the first metal oxide layer 12 remains without any change. The thickness of each of the first metal oxide layer 12 and the second metal oxide layer 14 is, for example, 10 to 70 nm, from the viewpoint achieving a thickness suitable for various touch panels.

Each of the first metal oxide layer 12 and the second metal oxide layer 14 can be produced by using a vacuum film formation method such as a vacuum deposition method, a sputtering method, an ion plating method, and a CVD method. Among them, a sputtering method is preferable because a smaller film-forming chamber can be used and the film-forming speed is high in a sputtering method. Examples of the sputtering method include DC magnetron sputtering. For the target, an oxide target or a metal or metalloid target can be used.

A wiring electrode or the like may be provided on the second metal oxide layer 14. A current to conduct through the metal layer 16, which will be described later, is introduced from a wiring electrode or the like to be provided on the second metal oxide layer 14 via the second metal oxide layer 14. Accordingly, it is preferable that the second metal oxide layer 14 have high conductivity. From such a viewpoint, for example, it is preferable that the surface resistance value of the second metal oxide layer 14 as a single film be $1.0 \times 10^{+7} \Omega/\square$ (=1.0E+7 $\Omega$/sq.) or lower, and it is more preferable that the surface resistance value of the second metal oxide layer 14 as a single film be $5.0 \times 10^{+6} \Omega/\square$ or lower.

The metal layer 16 is a layer containing a silver alloy as a primary component. The configuration in which the metal layer 16 has high conductivity allows the transparent conductor 100 to have sufficiently low surface resistance. The metal elements constituting the silver alloy are, for example, Ag and at least one selected from the group consisting of Pd, Cu, Nd, In, Sn, and Sb. Examples of the silver alloy include Ag—Pd, Ag—Cu, Ag—Pd—Cu, Ag—Nd—Cu, Ag—In—Sn, and Ag—Sn—Sb.

The metal layer 16 may contain an additive in addition to the silver alloy. It is preferable that the additive be easily removable by an etching solution. The content of the silver alloy in the metal layer 16 may be, for example, 90% by mass or more, or may be 95% by mass or more. The thickness of the metal layer 16 is, for example, 1 to 30 nm. From the viewpoint of sufficient enhancement of the total light transmittance of the transparent conductor 100 with the surface resistance kept sufficiently low, the thickness of the metal layer 16 is preferably 4 to 11 nm. If the thickness of the metal layer 16 is excessively large, the total light transmittance tends to be lower. If the thickness of the metal layer 16 is excessively small, on the other hand, the surface resistance tends to be higher.

The metal layer 16 has a function to adjust the total light transmittance and surface resistance of the transparent conductor 100. The metal layer 16 can be produced by using a vacuum film formation method such as a vacuum deposition method, a sputtering method, an ion plating method, and a CVD method. Among them, a sputtering method is preferable because a smaller film-forming chamber can be used and the film-forming speed is high in a sputtering method. Examples of the sputtering method include DC magnetron sputtering. For the target, a metal target can be used.

At least a part of the first metal oxide layer 12 and second metal oxide layer 14 and at least a part of the metal layer 16 in the transparent conductor 100 may be removed by etching or the like.

Figure 2:
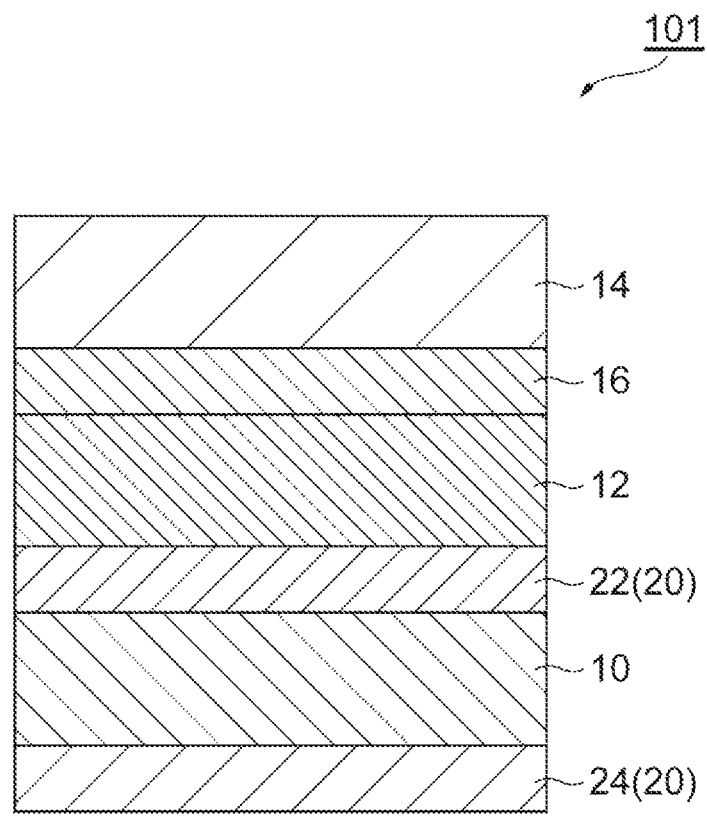
FIG. 2 is a cross-sectional view schematically illustrating another embodiment of the transparent conductor.

FIG. 2 is a schematic cross-sectional view illustrating another embodiment of the transparent conductor. A transparent conductor 101 differs from the transparent conductor 100 in that the transparent conductor 101 includes a pair of hardcoat layers 20 sandwiching the transparent resin substrate 10. The other constituents are the same as those of the transparent conductor 100.

The transparent conductor 101 includes, as a pair of hardcoat layers 20, a first hardcoat layer 22 on the main surface of the transparent resin substrate 10 in the first metal oxide layer 12 side, and a second hardcoat layer 24 on the main surface of the transparent resin substrate 10 in the side opposite to the first metal oxide layer 12 side. That is, the transparent conductor 101 has a laminate structure in which the second hardcoat layer 24, the transparent resin substrate 10, the first hardcoat layer 22, the first metal oxide layer 12, the metal layer 16, and the second metal oxide layer 14 are laminated in the order presented. The first hardcoat layer 22 and the second hardcoat layer 24 may be identical or different in thickness, structure, and composition. It is not necessary that both of the first hardcoat layer 22 and the second hardcoat layer 24 are included, and only one of them may be included.

The configuration in which the hardcoat layers 20 are provided can sufficiently prevent generation of a scratch in the transparent resin substrate 10. Each of the hardcoat layers 20 contains a cured resin obtained by curing a resin composition. It is preferable that the resin composition contain at least one selected from the group consisting of thermosetting resin compositions, ultraviolet-curable resin compositions, and electron beam-curable resin compositions. The thermosetting resin composition may contain at least one selected from the group consisting of epoxy resins, phenoxy resins, and melamine resins.

The resin composition is, for example, a composition containing a curable compound having an energy ray-reactive group such as a (meth)acryloyl group and a vinyl group. The representation "(meth)acryloyl group" means that at least one of an acryloyl group and a methacryloyl group is included. It is preferable that the curable compound contain a polyfunctional monomer or oligomer including two or more, preferably three or more, energy ray-reactive groups in one molecule.

The curable compound preferably contains an acrylic monomer. Specific examples of the acrylic monomer include 1,6-hexanediol di(meth)acrylate, triethylene glycol di(meth)acrylate, ethylene oxide-modified bisphenol A di(meth)acrylate, trimethylolpropane tri(meth)acrylate, trimethylolpropane ethylene oxide-modified tri(meth)acrylate, trimethylolpropane propylene oxide-modified tri(meth)acrylate, pentaerythritol tetra(meth)acrylate, di(trimethylolpropane) tetra(meth)acrylate, dipentaerythritol penta(meth)acrylate, dipentaerythritol hexa(meth)acrylate, pentaerythritol tri(meth)acrylate, and 3-(meth)acryloyloxy glycerin mono(meth)acrylate. However, the acrylic monomer is not necessarily limited to them. Other examples of the acrylic monomer include urethane-modified acrylates and epoxy-modified acrylates.

For the curable compound, a compound having a vinyl group may be used. Examples of the compound having a vinyl group include ethylene glycol divinyl ether, pentaerythritol divinyl ether, 1,6-hexanediol divinyl ether, trimethylolpropane divinyl ether, ethylene oxide-modified hydroquinone divinyl ether, ethylene oxide-modified bisphenol A divinyl ether, pentaerythritol trivinyl ether, dipentaerythritol hexavinyl ether, and di(trimethylolpropane) polyvinyl ether. However, the compound having a vinyl group is not necessarily limited to them.

In the case that the curable compound is cured with an ultraviolet ray, the resin composition contains a photopolymerization initiator. Various photopolymerization initiators can be used. For example, the photopolymerization initiator can be appropriately selected from known compounds including acetophenone-based, benzoin-based, benzophenone-based, and thioxanthone-based compounds. More specific examples of the photopolymerization initiator include DAROCUR 1173, IRGACURE 651, IRGACURE 184, IRGACURE 907 (trade names, manufactured by Ciba Specialty Chemicals Inc.), and KAYACURE DETX-S (trade name, manufactured by Nippon Kayaku Co., Ltd.).

The content of the photopolymerization initiator can be about 0.01 to 20% by mass or 0.5 to 5% by mass with respect to the mass of the curable compound. The resin composition may be a known resin composition obtained by adding a photopolymerization initiator to an acrylic monomer. Examples of the resin composition obtained by adding a photopolymerization initiator to an acrylic monomer include SD-318 (trade name, manufactured by Dainippon Ink and Chemicals) and XNR 5535 (trade name, manufactured by NAGASE & CO., LTD.), each as an ultraviolet-curable resin.

The resin composition may contain an organic fine particle and/or inorganic fine particle, for example, to enhance the strength of the coating film and/or adjust the refractive index. Examples of the organic fine particle include organic silicon fine particles, crosslinked acrylic fine particles, and crosslinked polystyrene fine particles. Examples of the inorganic fine particle include silicon oxide fine particles, aluminum oxide fine particles, zirconium oxide fine particles, titanium oxide fine particles, and iron oxide fine particles. Among them, silicon oxide fine particles are preferable.

Also preferable is a fine particle the surface of which has been treated with a silane coupling agent and includes energy ray-reactive groups including a (meth)acryloyl group and/or vinyl group present as a film thereon. Use of such a reactive fine particle can enhance the strength of the film through interparticle reaction of the fine particle or reaction between the fine particle and a polyfunctional monomer or oligomer during energy ray irradiation. A silicon oxide fine particle treated with a silane coupling agent containing a (meth)acryloyl group is preferably used.

The average particle diameter of the fine particle is smaller than the thickness of each of the hardcoat layers 20, and may be 100 nm or smaller, or 20 nm or smaller, from the viewpoint of ensuring sufficient transparency. From the viewpoint of production of a colloidal solution, on the other hand, the average particle diameter of the fine particle may be 5 nm or larger, or 10 nm or larger. In the case that an organic fine particle and/or inorganic fine particle is used, the total quantity of the organic fine particle and inorganic fine particle may be, for example, 5 to 500 parts by mass, or 20 to 200 parts by mass, with respect to 100 parts by mass of the curable compound.

If an energy ray-curable resin composition is used, the resin composition can be cured through irradiation with an energy ray such as an ultraviolet ray. Thus, use of such a resin composition is preferable from the viewpoint of the manufacture process.

The first hardcoat layer 22 can be produced by applying a solution or dispersion of a resin composition onto one surface of the transparent resin substrate 10 followed by drying to cure the resin composition. The application can be performed by using a known method. Examples of the application method include an extrusion nozzle method, a blade method, a knife method, a bar-coating method, a kiss-coating method, a kiss reverse method, a gravure roll method, a dipping method, a reverse roll method, a direct roll method, a curtain method, and a squeezing method. The second hardcoat layer 24 can be produced on the other surface of the transparent resin substrate 10 in the same manner as production of the first hardcoat layer 22.

The thickness of each of the first hardcoat layer 22 and the second hardcoat layer 24 is, for example, 0.5 to 10 µm. If the thickness is larger than 10 µm, unevenness in thickness or a wrinkle is likely to be generated. If the thickness is lower than 0.5 µm, on the other hand, in the case that quite a large quantity of low-molecular-weight components including a plasticizer or an oligomer is contained in the transparent resin substrate 10, it may be difficult to sufficiently prevent the bleed-out of the components. From the viewpoint of prevention of warpage, it is preferable that the thickness of the first hardcoat layer 22 be almost the same as that of the second hardcoat layer 24.

The refractive index of each of the first hardcoat layer 22 and the second hardcoat layer 24 is, for example, 1.40 to 1.60. It is preferable that the absolute value of the refractive index difference between the transparent resin substrate 10 and the first hardcoat layer 22 be 0.1 or less. It is preferable that the absolute value of the refractive index difference between the transparent resin substrate 10 and the second hardcoat layer 24 be also 0.1 or less. The configuration in which the absolute value of the refractive index difference between each of the first hardcoat layer 22 and the second hardcoat layer 24 and the transparent resin substrate 10 is small can reduce the intensity of interference unevenness generated by unevenness in thickness in the first hardcoat layer 22 and the second hardcoat layer 24.

The thickness of each layer constituting the transparent conductor 100 or 101 can be measured by using the following procedure. The transparent conductor 100 or 101 is cut with a focused ion beam (FIB) apparatus to obtain a cross-section. The cross-section is observed under a transmission electron microscope (TEM) to measure the thickness of each layer. It is preferable to measure at 10 or more positions arbitrarily selected to determine the average value. To obtain a cross-section, a microtome may be used as an apparatus other than a focused ion beam apparatus. For measurement of thickness, a scanning electron microscope (SEM) may be used. Alternatively, measurement of film thickness can be performed by using an X-ray fluorescence spectrometer.

The thickness of the transparent conductor 100 or 101 may be 200 µm or smaller, or may be 150 µm or smaller. Such a thickness can sufficiently meet the required level of thinning. The total light transmittance of the transparent conductor 100 or 101 can be, for example, as high as 85% or higher. The surface resistance value (four-terminal method) of the transparent conductor 100 or 101 can be controlled to, for example, 30Ω/□ or lower, or can be controlled even to 25Ω/□ or lower, even without thermal annealing of the first metal oxide layer 12 and the second metal oxide layer 14.

Each of the transparent conductors 100 and 101 having the above-described configurations has a laminate structure in which the first metal oxide layer 12, the metal layer 16, and the second metal oxide layer 14 are laminated. This laminate structure can be easily removed in a single operation with a common etching solution (acid). In addition, the laminate structure is excellent in resistance to alkalis. Accordingly, the laminate structure enables efficient formation of a pattern. In addition, each of the transparent conductors 100 and 101 has a high transmittance and has a high conductivity, even without performing thermal annealing. Accordingly, the transparent conductors 100 and 101 can be suitably used for a sensor film for touch panels.

Figure 3:
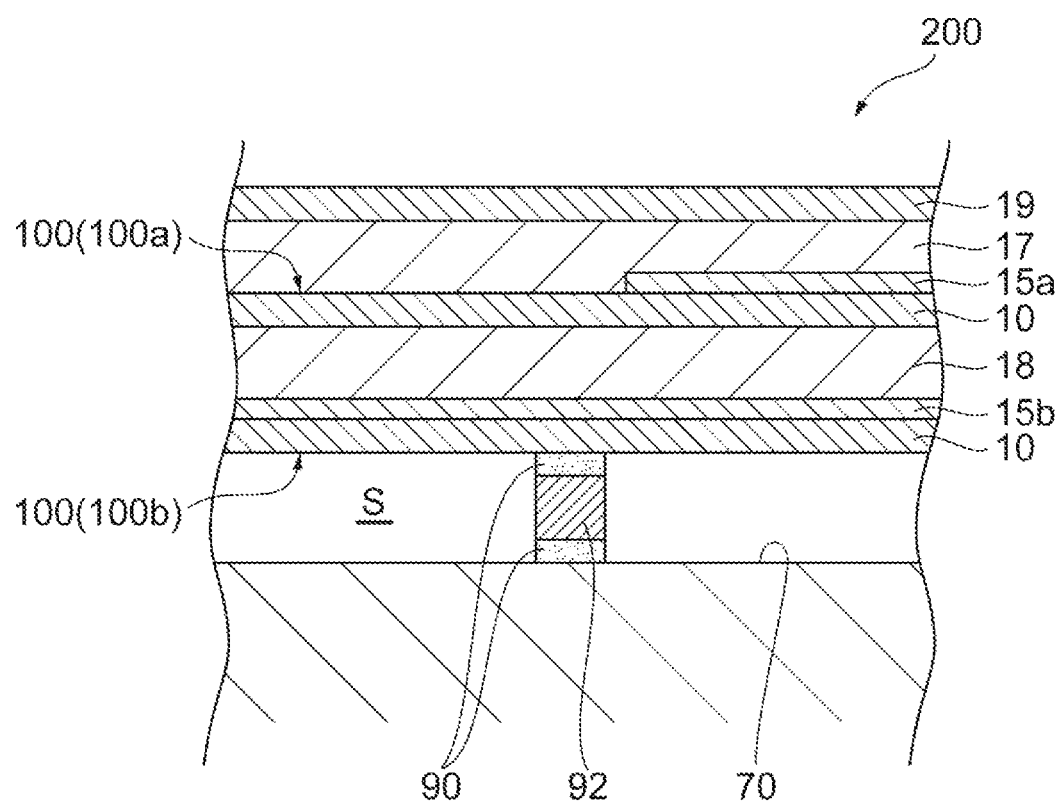
FIG. 3 is a schematic cross-sectional view illustrating an enlarged partial cross-section of the touch panel in one embodiment.
Figure 4:
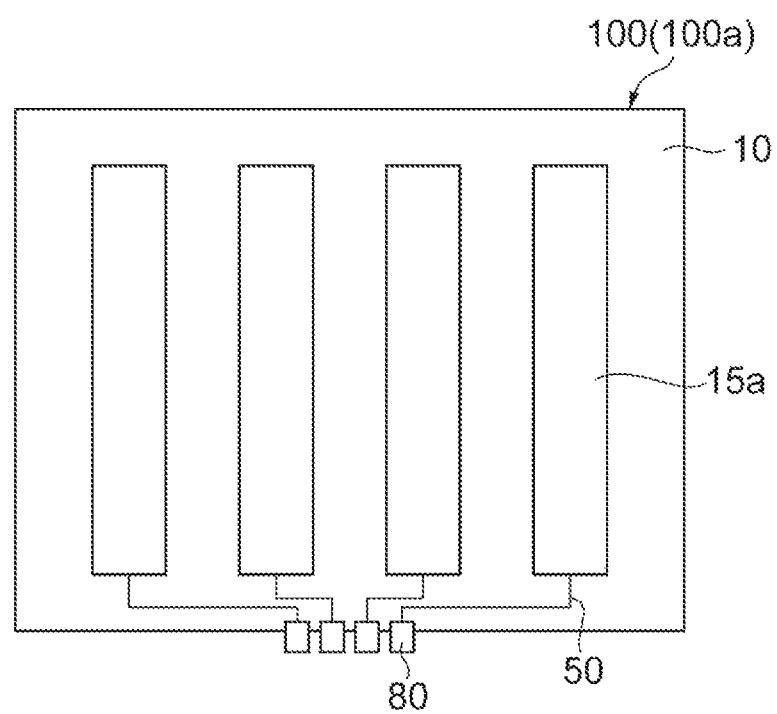
FIG. 4 is a plan view of a sensor film constituting one embodiment of the touch panel.
Figure 5:
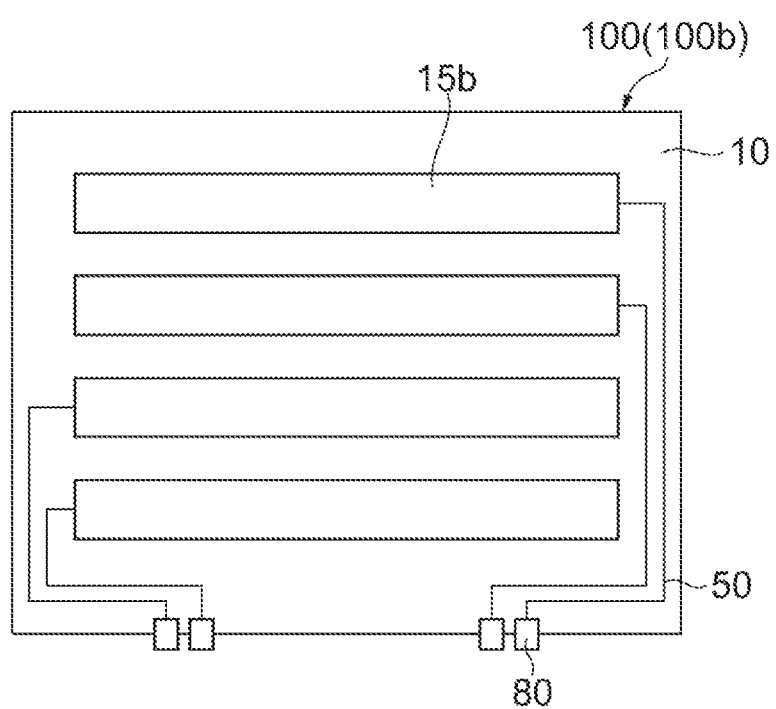
FIG. 5 is a plan view of a sensor film constituting one embodiment of the touch panel.
Figure 5:
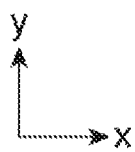

FIG. 3 is a schematic cross-sectional view illustrating an enlarged partial cross-section of a touch panel 200 including a pair of sensor films. FIGS. 4 and 5 are plan views of sensor films 100a and 100b, respectively, each with the above-described transparent conductor 100. The touch panel 200 includes a pair of sensor films 100a and 100b oppositely disposed via an optical clear adhesive 18. The touch panel 200 is configured to be capable of calculating a position touched by a contact body as a coordinate position (horizontal position and vertical position) in a two-dimensional coordinate (X-Y coordinate) plane parallel to a panel sheet 70 as a display.

Specifically, the touch panel 200 includes a sensor film 100a for detecting a vertical position (hereinafter, referred to as "sensor film for Y") and a sensor film 100b for detecting a horizontal position (hereinafter, referred to as "sensor film for X") pasted together via an optical clear adhesive 18. In the bottom surface side of the sensor film for X 100b, spacers 92 are provided between the sensor film for X 100b and the panel sheet 70 as a display device.

In the upper surface side of the sensor film for Y 100a (the side opposite to the panel sheet 70), a cover glass 19 is provided via an optical clear adhesive 17. That is, the touch panel 200 has a structure in which the sensor film for X 100b, the sensor film for Y 100a, and the cover glass 19 are disposed above the panel sheet 70 in the order presented from the panel sheet 70 side.

The sensor film for Y 100a for detecting a vertical position and the sensor film for X 100b for detecting a horizontal position are each composed of the above-described transparent conductor 100. The sensor film for Y 100a and the sensor film for X 100b include, as a conductive part, sensor electrodes 15a and sensor electrodes 15b, respectively, facing to the cover glass 19.

The sensor electrodes 15a each include the first metal oxide layer 12, the second metal oxide layer 14, and the metal layer 16. Each sensor electrode 15a may include the hardcoat layers 20. As illustrated in FIG. 4, the sensor electrodes 15a extend in the vertical direction (y direction) so as to detect a touched position in the vertical direction (y direction). The sensor electrodes 15a are disposed in parallel to each other along the vertical direction (y direction). One end of each sensor electrode 15a is connected to an electrode 80 in the driving IC side via a conductor line 50 formed of a silver paste.

The sensor film for X 100b for detecting a horizontal position includes sensor electrodes 15b on the surface facing to the sensor film for Y 100*a*. The sensor electrodes 15*b* each include the first metal oxide layer 12, the second metal oxide layer 14, and the metal layer 16. Each sensor electrode 15*b* may include the hardcoat layers 20. As illustrated in FIG. 5, the sensor electrodes 15*b* extend in the horizontal direction (x direction) so as to detect a touch position in the horizontal direction (x direction). The sensor electrodes 15*b* are disposed in parallel to each other along the horizontal direction (x direction). One end of each sensor electrode 15*b* is connected to an electrode 80 in the driving IC side via a conductor line 50 formed of a silver paste.

The sensor film for Y 100*a* and the sensor film for X 100*b* are laminated via the optical clear adhesive 18 in such a manner that the sensor electrodes 15*a* and 15*b* are perpendicular to each other as viewed from the direction of lamination of the sensor film for Y 100*a* and the sensor film for X 100*b*. In the side opposite to the sensor film for X 100*b* side of the sensor film for Y 100*a*, the cover glass 19 is provided via the optical clear adhesive 17. For the optical clear adhesives 17 and 18, the cover glass 19, and the panel sheet 70, common materials can be used.

Each of the conductor lines 50 and the electrodes 80 in FIGS. 4 and 5 includes a conductive material such as metal (e.g., Ag). The conductor lines 50 and the electrodes 80 are produced through pattern formation by screen printing. The transparent resin substrate 10 also has a function as a protective film to cover the surface of the touch panel 200.

The number and shape of the sensor electrodes 15*a* or 15*b* in each of the sensor films 100*a* and 100*b* are not limited to those in the embodiments illustrated in FIGS. 3, 4, and 5. For example, a larger number of the sensor electrodes 15*a* and 15*b* may be employed to enhance the precision of detecting a touched position.

As illustrated in FIG. 3, the panel sheet 70 is provided, via the spacers 92, in the side opposite to the sensor film for Y 100*a* side of the sensor film for X 100*b*. The spacers 92 can be provided at positions corresponding to the shape of the sensor electrodes 15*a* and 15*b* and at positions surrounding the entire of the sensor electrodes 15*a* and 15*b*. Each spacer 92 may be formed of a material with translucency such as a PET (polyethylene terephthalate) resin. One end of each spacer 92 is adhered to the bottom surface of the sensor film for X 100*b* with an optical clear adhesive or an adhesive 90 with translucency such as an acrylic adhesive and an epoxy adhesive. The other end of each spacer 92 is adhered to the panel sheet 70 as a display device with the adhesive 90. Thus, an interspace S can be provided between the sensor film for X 100*b* and the panel sheet 70 as a display device by disposing the sensor film for X 100*b* and the panel sheet 70 so as to face each other via the spacers 92.

To each electrode 80 illustrated in FIGS. 4 and 5, a control unit (IC) may be electrically connected. The capacity change of each of the sensor electrodes 15*a* and 15*b* caused by a capacitance change between the fingertip and the sensor film for Y 100*a* of the touch panel 200 is measured. The control unit can calculate the position touched by the contact body as a coordinate position (an intersection between a position in the X-axis direction and a position in the Y-axis direction) on the basis of the measurement results. In addition to the above methods, various known methods can be employed for the method for driving the sensor electrodes and method for calculating a coordinate position.

The touch panel 200 can be manufactured by using the following procedure. After the transparent conductor 100 is prepared, etching of the first metal oxide layer 12, the metal layer 16, and the second metal oxide layer 14 is performed for patterning. Specifically, by using the technique of photolithography, a resist material is applied onto the surface of the second metal oxide layer 14 through spin coating. Thereafter, pre-baking may be performed to improve the adhesion. Subsequently, a mask pattern is disposed, exposed, and developed with a developing solution to form a resist pattern. Formation of a resist pattern can be achieved not only through photolithography, but also through screen printing or the like.

Next, the transparent conductor 100 with the resist pattern formed thereon is soaked in an acidic etching solution to dissolve the second metal oxide layer 14 and the metal layer 16 for removal at the part without resist pattern formation. As necessary, the first metal oxide layer 12 may be dissolved for removal. The second metal oxide layer 14 is excellent in solubility in acids for etching. Thus, formation of an electrode pattern can be smoothly performed through removal of the second metal oxide layer 14 and the metal layer 16 in a single operation. Thereafter, the resist is removed with an alkaline solution, and thus the sensor film for Y 100*a* with the sensor electrodes 15*a* formed thereon and the sensor film for X 100*b* with the sensor electrodes 15*b* formed thereon can be obtained. Since the second metal oxide layer 14 is also excellent in resistance to alkalis, the resist can be smoothly removed, and thus the sensor electrodes 15*a* and 15*b* excellent in transparency and conductivity can be formed.

If the composition of the first metal oxide layer 12 and that of the second metal oxide layer 14 are different and the composition of the first metal oxide layer 12 does not allow removal of the first metal oxide layer 12 by etching, the first metal oxide layer 12 can remain without any change even after etching of the metal layer 16 and the second metal oxide layer 14 in a single operation. For the etching solution, an inorganic acid-based etching solution can be used. Suitable examples thereof include, but are not limited to, phosphoric acid-based etching solutions and hydrochloric acid-based etching solutions.

Subsequently, a metal paste such as a silver alloy paste is applied to form the conductor lines 50 and electrodes 80. Thus, the control unit and the sensor electrodes 15*a* and 15*b* are electrically connected. Next, the sensor film for Y 100*a* and the sensor film for X 100*b* are pasted together with the optical clear adhesive 18 in an manner such that the sensor electrodes 15*a* and 15*b* of the sensor film for Y 100*a* and the sensor film for X 100*b* protrude in the same direction. In this case, the sensor film for Y 100*a* and the sensor film for X 100*b* are pasted together in a manner such that the sensor electrodes 15*a* and 15*b* are perpendicular to each other as viewed from the direction of lamination of the sensor film for Y 100*a* and the sensor film for X 100*b*. Then, the cover glass 19 and the sensor film for Y 100*a* are pasted together with the optical clear adhesive 17. Thus, the touch panel 200 can be manufactured.

The touch panel 200 uses the transparent conductor 100 as the sensor film for Y 100*a* and the sensor film for X 100*b*. The transparent conductor 100 allows removal of the second metal oxide layer 14 and the metal layer 16, and, optionally, the first metal oxide layer 12 by etching in a single operation. Accordingly, the touch panel 200 can be efficiently manufactured through simplification of the manufacture process for the touch panel 200.

It is not necessary to use the transparent conductor 100 for both of the sensor film for Y 100*a* and the sensor film for X 100*b*, and another transparent conductor may be used for any one of the sensor film for Y 100*a* and the sensor film for X 100*b*. Even such a touch panel can provide a sufficiently clear display. Alternatively, the transparent conductor 101 may be used for the sensor films in place of the transparent conductor 100.

As described above, the transparent conductors 100 and 101 can be suitably used for touch panels. However, the application is not limited to touch panels, and if the first metal oxide layer 12, the second metal oxide layer 14, and the metal layer 16 are processed into a predetermined shape by etching to form a part including the first metal oxide layer 12, the second metal oxide layer 14, and the metal layer 16 (conductive part) and a part not including the first metal oxide layer 12, the second metal oxide layer 14, and the metal layer 16 (nonconductive part), for example, the product can be used for transparent electrodes, prevention of electrostatic charging, and electromagnetic shielding in various display devices including liquid crystal displays (LCDs), plasma display panels (PDPs), and electroluminescence panels (organic EL, inorganic EL), electrochromic elements, and electronic papers. In addition, the product can be used as an antenna.

While the suitable embodiments of the present invention have been described hereinbefore, the present invention is not limited to the above-described embodiments. While the above-described transparent conductor 101 includes a pair of the hardcoat layers 20, the transparent conductor 101 may include only one of the first hardcoat layer 22 and the second hardcoat layer 24, for example. Alternatively, a configuration may be used in which a hardcoat layer is provided on one surface of the transparent resin substrate 10 and a plurality of optical adjustment layers is provided on the other surface by application. In this case, the first metal oxide layer 12, the metal layer 16, and the second metal oxide layer 14 may be provided above the optical adjustment layers. Further, any layer other than the above-described layers may be provided at any position of the transparent conductor 100 or 101 in a manner such that the function is not largely impaired.

EXAMPLES

Hereinafter, the present invention will be described more specifically with reference to Examples and Comparative Examples; however, the present invention is never limited to the Examples.

Examples 1 to 11

(Production of Transparent Conductor)

Transparent conductors as illustrated in FIG. 2 were produced. The transparent conductors each had a laminate structure in which a transparent resin substrate sandwiched between a pair of hardcoat layers, a first metal oxide layer, a metal layer, and a second metal oxide layer laminated in the order presented. The transparent conductor of each Example was produced in the following manner.

A polyethylene terephthalate film (manufactured by TORAY INDUSTRIES, INC., product number: U48) with a thickness of 100 μm was prepared. The PET film was used as the transparent resin substrate. A coating material for production of the first hardcoat layer and the second hardcoat layer was prepared by using the following procedure.

The following raw materials were prepared.

colloidal silica modified with reactive groups (dispersion medium: propylene glycol monomethyl ether acetate, nonvolatile content: 40% by mass): 100 parts by mass
dipentaerythritol hexaacrylate: 48 parts by mass
1,6-hexanediol diacrylate: 12 parts by mass
photopolymerization initiator (1-hydroxycyclohexyl phenyl ketone): 2.5 parts by mass The above raw materials were diluted with a solvent (propylene glycol monomethyl ether (PGMA)) and mixed together to disperse the components in the solvent. Thereby, a coating material with a nonvolatile content (NV) of 25.5% by mass was prepared. The thus-obtained coating material was used as a coating material for production of the first hardcoat layer and the second hardcoat layer.

The coating material for production of the first hardcoat layer was applied onto one surface of the transparent resin substrate to produce a coating film. After the solvent in the coating film was removed in a hot air drying oven set at 80° C., the coating film was irradiated for curing with an ultraviolet ray by using a UV treatment apparatus at an integrated light intensity of 400 mJ/cm$^2$. Thus, the first hardcoat layer with a thickness of 2 μm was produced on one surface of the transparent resin substrate. Similarly, the second hardcoat layer with a thickness of 2 μm was produced on the other surface of the transparent resin substrate.

The first metal oxide layer, the metal layer, and the second metal oxide layer were sequentially formed above the first hardcoat layer through DC magnetron sputtering. The first metal oxide layer and the second metal oxide layer were formed by using a ZnO—In$_2$O$_3$—TiO$_2$—SnO$_2$ target having a composition listed in Table 1. The first metal oxide layer and the second metal oxide layer in each Example were formed by using a target having an identical composition. The composition of the first metal oxide layer and the second metal oxide layer in each Example was as listed in Table 1. The thickness of each of the first metal oxide layer and the second metal oxide layer in each Example was 50 nm.

In all of Examples shown in Table 1, the metal layer was formed by using an Ag—Pd—Cu (Ag:Pd:Cu=99.0:0.5:0.5 (% by mass)) target. The thickness of the metal layer 16 was 5 nm.

(Evaluation of Transparent Conductor)

The total light transmittance (transmittance) of the transparent conductor of each Example was measured by using a hazemeter (trade name: NDH-7000, manufactured by NIPPON DENSHOKU INDUSTRIES CO., LTD.). The measurement results were as shown in Table 2. Subsequently, the solubility in acids for etching was evaluated by using the following procedure. First, a PAN-based etching solution containing phosphoric acid, acetic acid, nitric acid, and hydrochloric acid was prepared. The transparent conductor of each Example was soaked in the etching solution at room temperature for 1 minute to perform etching. Thereafter, measurement of total light transmittance was performed to determine whether the first metal oxide layer, the metal layer, and the second metal oxide layer were dissolved. Specifically, a case that the total light transmittance of a sample after the etching was identical to the total light transmittance of a laminate consisting of three layers of the first hardcoat layer, the transparent resin substrate, and the second hardcoat layer was rated as "A", and a case that they were not identical was rated as "B". The evaluation results were as shown in Table 2.

The resistance to alkalis was evaluated by using the following procedure. A KOH aqueous solution with a KOH concentration of 3% by mass was prepared. The transparent conductor of each Example was soaked in the alkaline solution at room temperature for 2 minutes. Thereafter, measurement of total light transmittance was performed to determine whether the first metal oxide layer, the metal layer, and the second metal oxide layer were dissolved. Specifically, a case that the total light transmittance of a sample after the soaking in the alkaline solution was identical to the total light transmittance before the soaking was rated as "A", and a case that they were not identical was rated as "B". The evaluation results were as shown in Table 2.

The surface resistance of the transparent conductor of each Example was measured by using a four-terminal resistivity meter (trade name: Loresta GP, manufactured by Mitsubishi Chemical Corporation). The results are shown in Table 2. In Table 2, "Surface resistance (1)" is a surface resistance value before storing a transparent conductor under an environment of 85° C. and 85% RH (relative humidity of 85%), and "Surface resistance (2)" is a surface resistance value after storing under the environment for 50 hours.

After the transparent conductor of each Example was stored under an environment of 85° C. and 85% RH for 50 hours, the storage stability was visually evaluated. A case that white turbidity was observed in the transparent conductor was rated as "B", and a case that no white turbidity was observed was rated as "A". The results were as shown in Table 2.

TABLE 1

| | Composition (mol %) | | | | |
| --- | --- | --- | --- | --- | --- |
| | ZnO | In$_2$O$_3$ | TiO$_2$ | SnO$_2$ | Total |
| Example 1 | 21.0 | 28.3 | 12.7 | 38.0 | 100 |
| Example 2 | 30.6 | 28.6 | 13.4 | 27.3 | 100 |
| Example 3 | 34.8 | 30.2 | 13.8 | 21.3 | 100 |
| Example 4 | 36.5 | 28.7 | 12.7 | 22.1 | 100 |
| Example 5 | 41.9 | 27.0 | 12.2 | 19.0 | 100 |
| Example 6 | 43.6 | 25.7 | 11.5 | 19.2 | 100 |
| Example 7 | 41.4 | 29.0 | 13.0 | 16.5 | 100 |
| Example 8 | 59.7 | 18.6 | 8.5 | 13.2 | 100 |

TABLE 1-continued

| | Composition (mol %) | | | | |
| --- | --- | --- | --- | --- | --- |
| | ZnO | In$_2$O$_3$ | TiO$_2$ | SnO$_2$ | Total |
| Example 9 | 63.9 | 16.8 | 7.4 | 12.0 | 100 |
| Example 10 | 59.1 | 21.8 | 11.2 | 8.0 | 100 |
| Example 11 | 65.9 | 17.9 | 9.8 | 6.4 | 100 |

TABLE 2

| | Evaluation results | | | | | |
| --- | --- | --- | --- | --- | --- | --- |
| | Transmittance (%) | Solubility in acids | Resistance to alkalis | Surface resistance (1) (Ω/sq.) | Surface resistance (2) (Ω/sq.) | Storage stability |
| Example 1 | 89.5 | A | A | 21.5 | 21.5 | A |
| Example 2 | 89.3 | A | A | 22.3 | 22.3 | A |
| Example 3 | 89.7 | A | A | 20.7 | 20.7 | A |
| Example 4 | 89.4 | A | A | 21.1 | 21.1 | A |
| Example 5 | 89.8 | A | A | 21.4 | 21.4 | A |
| Example 6 | 89.1 | A | A | 20.6 | 20.6 | A |
| Example 7 | 89.9 | A | A | 22.1 | 22.1 | A |
| Example 8 | 89.5 | A | A | 21.3 | 21.3 | A |
| Example 9 | 89.8 | A | A | 21.8 | 21.8 | A |
| Example 10 | 89.3 | A | A | 22.4 | 22.4 | A |
| Example 11 | 89.5 | A | A | 21.5 | 21.5 | A |

As shown in Table 2, the solubility in acids and resistance to alkalis were rated as "A" for all of Examples. This result confirmed that the metal oxide layers and the metal layer in the transparent conductor of each of Examples 1 to 11 can be removed by etching in a single operation. In addition, it was found that the metal oxide layers in the transparent conductor of each of Examples 1 to 11 have excellent resistance to alkalis.

To evaluate the properties of each metal oxide layer, a sample of a single metal oxide layer (monolayer) was prepared by using the above-described procedure. The composition of each metal oxide layer is listed in Table 3. Evaluation of these samples was performed by using the above-described procedure. The evaluation results are shown in Table 4. The absorbance in Table 4 is a value determined from the formula "100−transmittance−reflectance=absorbance" by using the measurement results for transmittance and reflectance with a spectrometer. The absorbance is a value at a wavelength of 380 nm. The value "3.6E+04 (Ω/sq.)" for Surface resistance (1) and Surface resistance (2) for Example 1 indicates "3.6×10$^{+4}$ (Ω/sq.)". The same is applied to the other Examples.

TABLE 3

| | Composition (mol %) | | | | |
| --- | --- | --- | --- | --- | --- |
| | ZnO | In$_2$O$_3$ | TiO$_2$ | SnO$_2$ | Total |
| Example 1 | 21.0 | 28.3 | 12.7 | 38.0 | 100 |
| Example 2 | 30.6 | 28.6 | 13.4 | 27.3 | 100 |
| Example 3 | 34.8 | 30.2 | 13.8 | 21.3 | 100 |
| Example 4 | 36.5 | 28.7 | 12.7 | 22.1 | 100 |
| Example 5 | 41.9 | 27.0 | 12.2 | 19.0 | 100 |
| Example 6 | 43.6 | 25.7 | 11.5 | 19.2 | 100 |
| Example 7 | 41.4 | 29.0 | 13.0 | 16.5 | 100 |
| Example 8 | 59.7 | 18.6 | 8.5 | 13.2 | 100 |
| Example 9 | 63.9 | 16.8 | 7.4 | 12.0 | 100 |
| Example 10 | 59.1 | 21.8 | 11.2 | 8.0 | 100 |
| Example 11 | 65.9 | 17.9 | 9.8 | 6.4 | 100 |

TABLE 4

| | \multicolumn{6}{c|}{Evaluation results} |
| --- | --- | --- | --- | --- | --- | --- |
| | Absorbance (%) | Solubility in acids | Resistance to alkalis | Surface resistance (1) (Ω/sq.) | Surface resistance (2) (Ω/sq.) | Storage stability |
| Example 1 | 12.1 | A | A | 3.6E+04 | 3.6E+04 | A |
| Example 2 | 13.6 | A | A | 1.2E+05 | 1.2E+05 | A |
| Example 3 | 13.3 | A | A | 2.5E+05 | 2.5E+05 | A |
| Example 4 | 13.2 | A | A | 9.7E+04 | 9.7E+04 | A |
| Example 5 | 13.8 | A | A | 1.5E+05 | 1.5E+05 | A |
| Example 6 | 12.6 | A | A | 3.0E+05 | 3.0E+05 | A |
| Example 7 | 12.2 | A | A | 2.1E+05 | 2.1E+05 | A |
| Example 8 | 12.6 | A | A | 1.8E+05 | 1.8E+05 | A |
| Example 9 | 12.1 | A | A | 2.3E+05 | 2.3E+05 | A |
| Example 10 | 11.8 | A | A | 2.5E+05 | 2.5E+05 | A |
| Example 11 | 11.2 | A | A | 4.1E+05 | 4.1E+05 | A |

As shown in Table 4, it was found that the metal oxide layer in each Example has a sufficiently low absorbance. In addition, it was found that the metal oxide layer in each Example is sufficiently excellent in solubility in acids, resistance to alkalis and storage stability.

Examples 12 to 22

Transparent conductors were produced in the same manner as in Example 5, except that, as shown in Table 5, the composition of the metal layer was changed through changing the composition of a target for production of the metal layer and/or the thickness of the metal layer was changed. In Examples 12 to 18, only the thickness of the metal layer was changed. In Example 19, the metal layer was formed by using an Ag—Nd—Cu (Ag:Nd:Cu=99.0:0.5:0.5 (% by mass)) target. In Example 20, the metal layer was formed by using an Ag—In—Sn (Ag:In:Sn=99.0:0.5:0.5 (% by mass)) target. In Example 21, the metal layer was formed by using an Ag—Sn—Sb (Ag:Sn:Sb=99.0:0.5:0.5 (% by mass)) target. In Example 22, the metal layer was formed by using an Ag—Cu (Ag:Cu=99.5:0.5 (% by mass)) target.

Evaluation of the transparent conductor of each of Examples 12 to 22 was performed in the same manner as in Example 5. The evaluation results were as shown in Table 6. Note that the composition and thickness in each of Examples 12 to 22 were identical to those in Example 5.

TABLE 5

| | \multicolumn{2}{c|}{Metal layer} |
| --- | --- | --- |
| | Composition | Thickness |
| Example 12 | Ag—Pd—Cu | 3 nm |
| Example 13 | Id. | 4 nm |
| Example 5 | Id. | 5 nm |
| Example 14 | Id. | 7 nm |
| Example 15 | Id. | 9 nm |
| Example 16 | Id. | 11 nm |
| Example 17 | Id. | 15 nm |
| Example 18 | Id. | 20 nm |
| Example 19 | Ag—Nd—Cu | 5 nm |
| Example 20 | Ag—In—Sn | 5 nm |
| Example 21 | Ag—Sn—Sb | 5 nm |
| Example 22 | Ag—Cu | 5 nm |

TABLE 6

| | \multicolumn{6}{c|}{Evaluation results} |
| --- | --- | --- | --- | --- | --- | --- |
| | Transmittance (%) | Solubility in acids | Resistance to alkalis | Surface resistance (1) (Ω/sq.) | Surface resistance (2) (Ω/sq.) | Storage stability |
| Example 12 | 87.2 | A | A | 46.3 | 46.3 | A |
| Example 13 | 88.5 | A | A | 31.8 | 31.8 | A |
| Example 5 | 89.8 | A | A | 21.4 | 21.4 | A |
| Example 14 | 89.9 | A | A | 14.8 | 14.8 | A |
| Example 15 | 89.7 | A | A | 9.8 | 9.8 | A |
| Example 16 | 87.2 | A | A | 7.5 | 7.5 | A |
| Example 17 | 79.2 | A | A | 4.6 | 4.6 | A |
| Example 18 | 70.6 | A | A | 3.1 | 3.1 | A |
| Example 19 | 88.6 | A | A | 24.6 | 24.6 | B |
| Example 20 | 89.2 | A | A | 23.5 | 23.5 | B |
| Example 21 | 89.5 | A | A | 22.7 | 22.7 | B |
| Example 22 | 90.2 | A | A | 21.1 | 21.1 | B |

The results in Table 6 show that the solubility in acids and resistance to alkalis were rated as "A" for all of Examples. This confirmed that the metal oxide layers and the metal layer in the transparent conductor of each of Examples 12 to 22 can be removed by etching in a single operation. It was found that the surface resistance tends to be lower as the thickness of the metal layer is larger, and that the total light transmittance tends to be lower when the thickness of the metal layer is excessively large. The case that the silver alloy contained Pd was found to provide particularly excellent storage stability.

Comparative Examples 1 to 4

Transparent conductors of Comparative Examples 1 to 4 were produced in the same manner as in Example 1, except that a target having a composition listed in Table 7 was used as a target for formation of the first metal oxide layer and the second metal oxide layer. In Comparative Example 1, the first metal oxide layer and the second metal oxide layer were formed by using a $ZnO$—$TiO_2$—$Nb_2O_5$ target. In Comparative Example 2, a $ZnO$—$In_2O_3$—$Cr_2O_3$ target was used. In Comparative Example 3, a $ZnO$—$SnO_2$—$Cr_2O_3$ target was used. In Comparative Example 4, a $ZnO$—$In_2O_3$—$SnO_2$ target was used. The first metal oxide layer and the second metal oxide layer in each Comparative Example were formed by using a target having an identical composition. The composition of the first metal oxide layer and the second metal oxide layer in each Comparative Example was as listed in Table 7. The solubility in acids and resistance to alkalis of the transparent conductor of each Comparative Example was evaluated in the same manner as in Example 1. The results were as shown in Table 7.

TABLE 7

| | Composition (mol %) | | | | Solubility in acids | Resistance to alkalis |
|---|---|---|---|---|---|---|
| | ZnO | $TiO_2$ | $Nb_2O_5$ | total | B | B |
| Comparative Example 1 | 74.6 | 12.8 | 12.6 | 100 | | |
| | ZnO | $In_2O_3$ | $Cr_2O_3$ | total | B | B |
| Comparative Example 2 | 68.2 | 23.1 | 8.7 | 100 | | |
| | ZnO | $SnO_2$ | $Cr_2O_3$ | total | B | B |
| Comparative Example 3 | 72.3 | 8.4 | 19.3 | 100 | | |
| | ZnO | $In_2O_3$ | $SnO_2$ | total | B | A |
| Comparative Example 4 | 31.5 | 18.4 | 50.2 | 100 | | |

As shown in Table 7, it was found that a transparent conductor including metal oxide layers without the four components of zinc oxide, indium oxide, titanium oxide, and tin oxide cannot achieve excellent solubility in acids and excellent resistance to alkalis in combination.

INDUSTRIAL APPLICABILITY

The present disclosure provides a transparent conductor allowing easy removal of the metal oxide layers and the metal layer by etching. In addition, the present disclosure provides a touch panel which can be easily manufactured by using such a transparent conductor.

REFERENCE SIGNS LIST

10: transparent resin substrate, 12: first metal oxide layer, 14: second metal oxide layer, 16: metal layer, 15a, 15b: sensor electrode, 20: hardcoat layer, 22: first hardcoat layer, 24: second hardcoat layer, 50: conductor line, 70: panel sheet, 80: electrode, 90: adhesive, 92: spacer, 100, 101: transparent conductor, 100a: sensor film for Y, 100b: sensor film for X, 200: touch panel

The invention claimed is:

1. A transparent conductor comprising:
    a hardcoat layer, a transparent resin substrate, another hardcoat layer, a first metal oxide layer, a metal layer containing a silver alloy, and a second metal oxide layer laminated in the order presented,
    wherein the second metal oxide layer contains zinc oxide, indium oxide, titanium oxide, and tin oxide, and
    wherein the hardcoat layer and the another hardcoat layer contain a cured resin.

2. The transparent conductor according to claim 1,
    wherein, in the second metal oxide layer, a content of the zinc oxide is 20 to 68 mol %, a content of the indium oxide is 15 to 35 mol %, a content of the titanium oxide is 5 to 15mol %, and a content of the tin oxide is 5 to 40 mol %, with respect to a total of four components of the zinc oxide, the indium oxide, the titanium oxide, and the tin oxide in terms of ZnO, $In_2O_3$, $TiO_2$, and $SnO_2$, respectively.

3. The transparent conductor according to claim 1, wherein a thickness of the metal layer is 4 to 11 nm.

4. The transparent conductor according to claim 1,
    wherein the first metal oxide layer contains zinc oxide, indium oxide, titanium oxide, and tin oxide, and,
    wherein, in the first metal oxide layer, a content of the zinc oxide is 20 to 68 mol %, a content of the indium oxide is 15 to 35 mol %, a content of the titanium oxide is 5 to 15mol %, and a content of the tin oxide is 5 to 40 mol %, with respect to a total of four components of the zinc oxide, the indium oxide, the titanium oxide, and the tin oxide in terms of ZnO, $In_2O_3$, $TiO_2$, and $SnO_2$, respectively.

5. The transparent conductor according to claim 1,
    wherein the silver alloy is an alloy of Ag and at least one metal selected from the group consisting of Pd, Cu, Nd, In, Sn, and Sb.

6. A touch panel comprising a sensor film on a panel sheet,
    wherein the sensor film is configured with the transparent conductor according to claim 1.

7. The transparent conductor according to claim 1, wherein an absolute value of a refractive index difference between the transparent resin substrate and the hardcoat layer is 0.1 or less, and an absolute value of a refractive index difference between the transparent resin substrate and the another hardcoat layer is 0.1 or less.

8. A touch panel comprising a sensor film on a panel sheet,
    wherein the sensor film is configured with the transparent conductor according to claim 7.

9. A touch panel comprising a sensor film on a panel sheet,
    wherein the sensor film is configured with a transparent conductor,
    wherein the transparent conductor includes a transparent resin substrate, a first metal oxide layer, a metal layer containing a silver alloy, and a second metal oxide layer laminated in the order presented, and
    wherein the second metal oxide layer contains zinc oxide, indium oxide, titanium oxide, and tin oxide.

10. The touch panel according to claim 9,
    wherein, in the second metal oxide layer, a content of the zinc oxide is 20 to 68 mol %, a content of the indium oxide is 15 to 35 mol %, a content of the titanium oxide is 5 to 15mol %, and a content of the tin oxide is 5 to 40 mol %, with respect to a total of four components of the zinc oxide, the indium oxide, the titanium oxide, and the tin oxide in terms of ZnO, $In_2O_3$, $TiO_2$, and $SnO_2$, respectively.

11. The touch panel according to claim 9, wherein a thickness of the metal layer is 4 to 11 nm.

12. The touch panel according to claim 9,
    wherein the first metal oxide layer contains zinc oxide, indium oxide, titanium oxide, and tin oxide, and
    wherein, in the first metal oxide layer, a content of the zinc oxide is 20 to 68 mol %, a content of the indium oxide is 15 to 35 mol %, a content of the titanium oxide is 5 to 15mol %, and a content of the tin oxide is 5 to 40 mol %, with respect to a total of four components of the zinc oxide, the indium oxide, the titanium oxide, and the tin oxide in terms of ZnO, $In_2O_3$, $TiO_2$, and $SnO_2$, respectively.

13. The touch panel according to claim 9, wherein the silver alloy is an alloy of Ag and at least one metal selected from the group consisting of Pd, Cu, Nd, In, Sn, and Sb.

* * * * *